(12) United States Patent
Kalamaras

(10) Patent No.: US 9,706,880 B1
(45) Date of Patent: Jul. 18, 2017

(54) SHAKER BOTTLE AND AGITATOR

(71) Applicant: Michael P. Kalamaras, Cary, IL (US)

(72) Inventor: Michael P. Kalamaras, Cary, IL (US)

( * ) Notice: Subject to any disclaimer, the term of this patent is extended or adjusted under 35 U.S.C. 154(b) by 279 days.

(21) Appl. No.: 14/484,306

(22) Filed: Sep. 12, 2014

Related U.S. Application Data

(60) Provisional application No. 61/879,848, filed on Sep. 19, 2013.

(51) Int. Cl.
*A47J 43/27* (2006.01)

(52) U.S. Cl.
CPC ..................................... *A47J 43/27* (2013.01)

(58) Field of Classification Search
CPC ...................................................... A47J 43/27
USPC .................................................. 366/130, 332
See application file for complete search history.

(56) References Cited

U.S. PATENT DOCUMENTS

| | | | |
|---|---|---|---|
| 1,060,419 A | 4/1913 | Benjamin | |
| 1,931,087 A * | 10/1933 | Schwarz et al. | A47G 19/24 222/196.5 |
| 3,136,532 A * | 6/1964 | Rudnick | A47J 43/27 366/130 |
| 3,760,972 A | 9/1973 | McKirnan | |
| 3,820,692 A | 6/1974 | Swett | |
| D232,238 S | 7/1974 | La Borde | |
| 3,924,807 A | 12/1975 | Morgan | |
| 4,640,623 A | 2/1987 | Tornell | |
| 4,668,442 A | 5/1987 | Lang | |
| 5,151,720 A | 9/1992 | Kanbar | |
| D331,793 S | 12/1992 | Erwes | |
| 5,544,960 A | 8/1996 | Sommovigo | |
| 5,690,819 A | 11/1997 | Chianh | |
| 6,379,032 B1 | 4/2002 | Sorensen | |
| 6,471,391 B1 | 10/2002 | Opitz | |
| D510,235 S | 10/2005 | Sorensen | |
| 7,441,941 B2 | 10/2008 | Vernon | |
| D656,357 S | 3/2012 | Enghard | |
| 2014/0119154 A1* | 5/2014 | Kershaw | B01F 13/0022 366/130 |

FOREIGN PATENT DOCUMENTS

WO 2013063535 A1 5/2013

* cited by examiner

*Primary Examiner* — David Sorkin
(74) *Attorney, Agent, or Firm* — James Creighton Wray; Meera P. Narasimhan

(57) ABSTRACT

A shaker assembly has a body with viewing panels on opposite sides. An agitator is viewable through the viewing panels. Agitators have printable panels or molded figurines which may be in shapes of corporate logos or names. Conically tapered springs have inner smaller ring-shaped ends connected an agitator and outer larger ring-shaped ends positioned away from the agitator. The printed panels or molded figurines are visible through the viewing panels when the shaker assembly is in motion or at rest. The lid has a smooth outer surface. A hinged cover rotates outward from the smooth outer surface to open a pouring spout in the lid. A carabiner clip rotates outward from the smooth outer surfaces of the lid and hinged cover. When closed and stored, the cover and the carabiner clip complete the smooth outer surfaces of the lid.

20 Claims, 15 Drawing Sheets

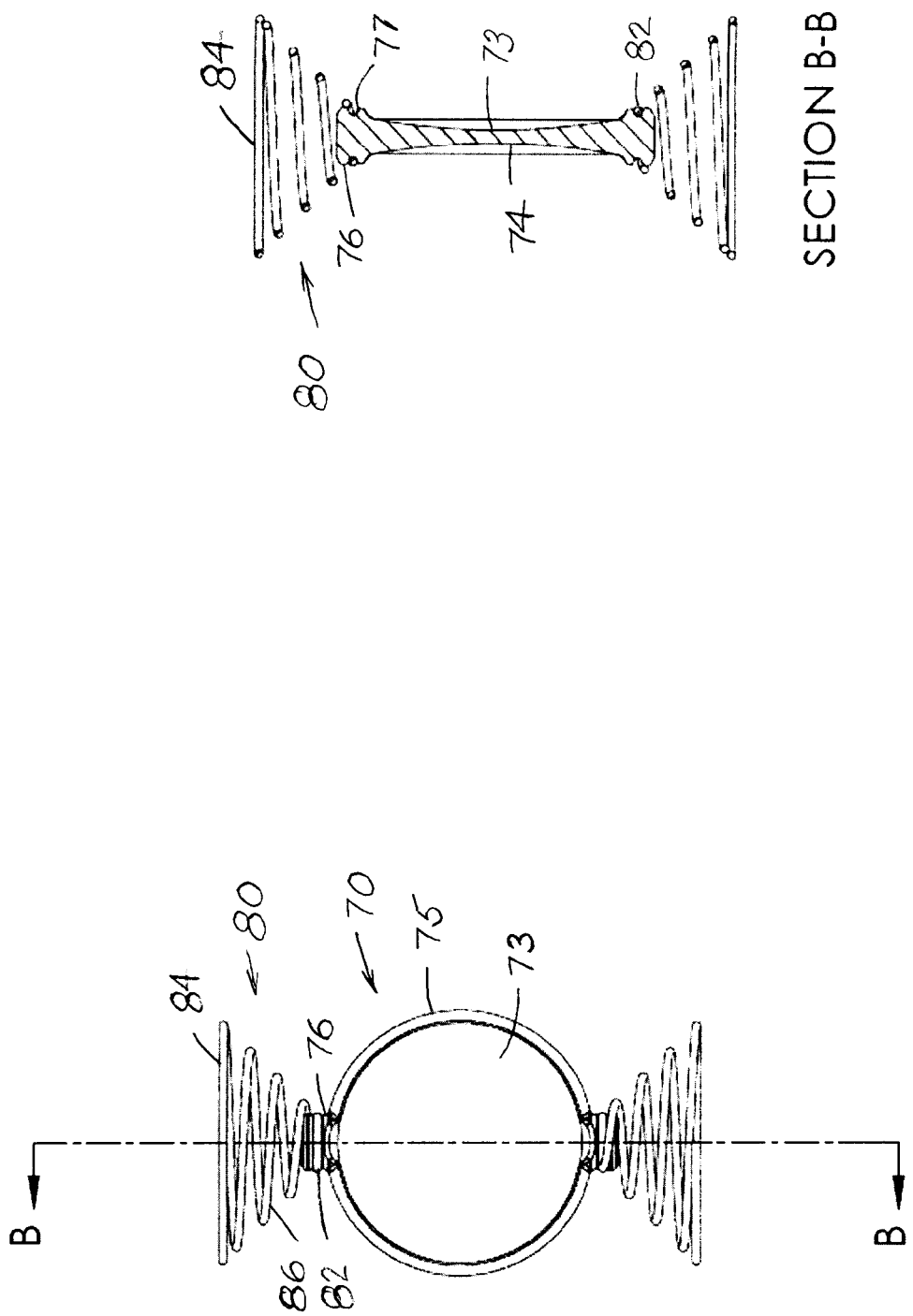

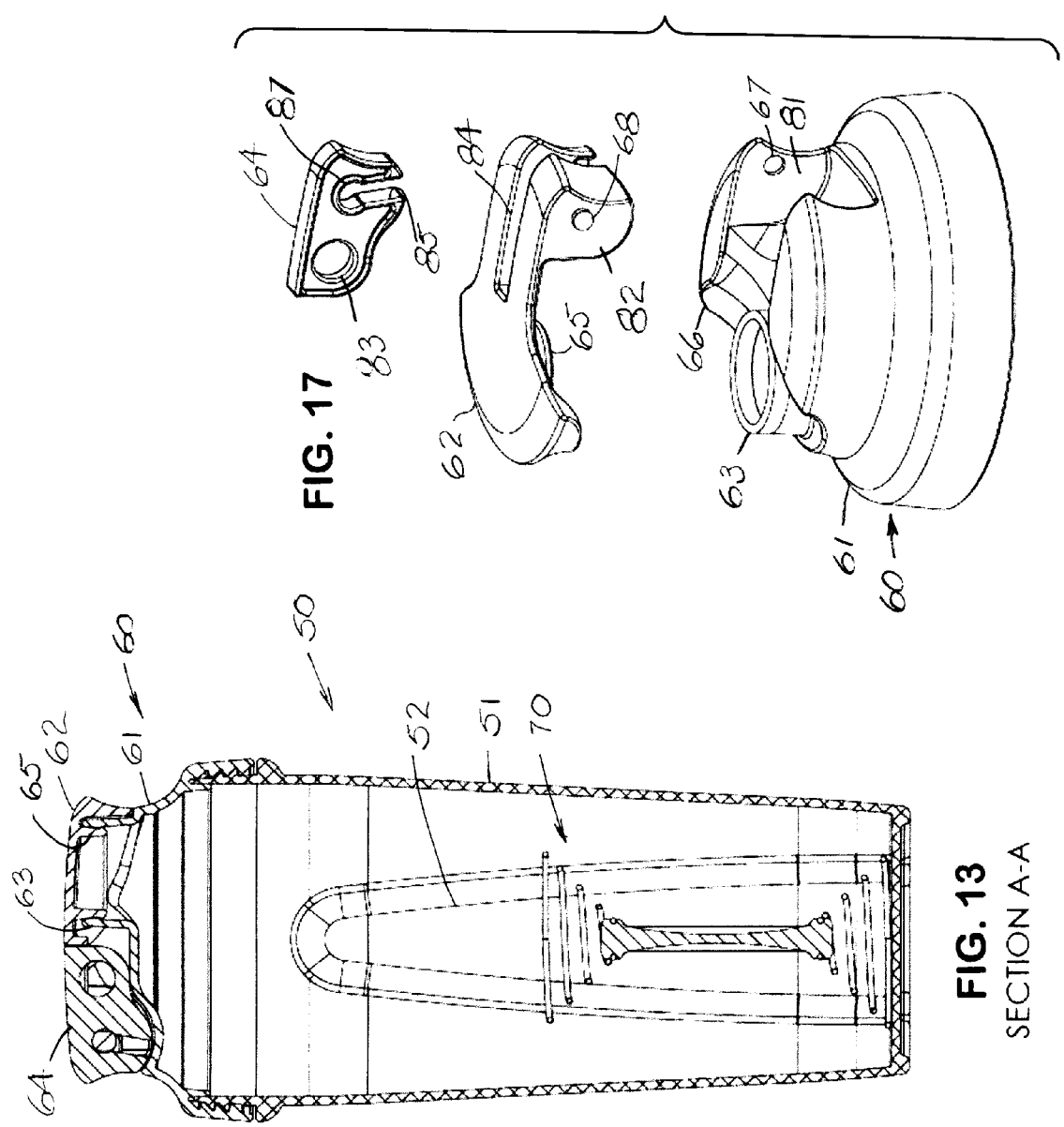

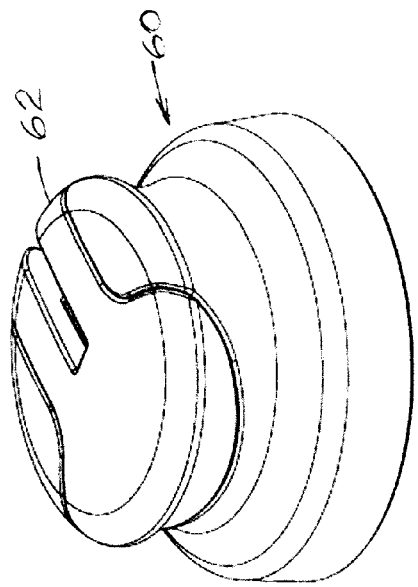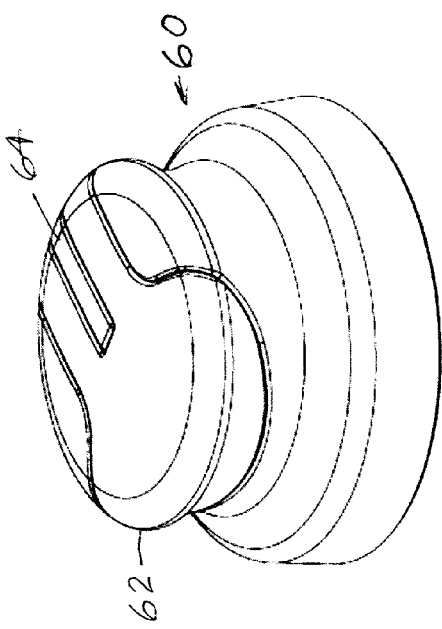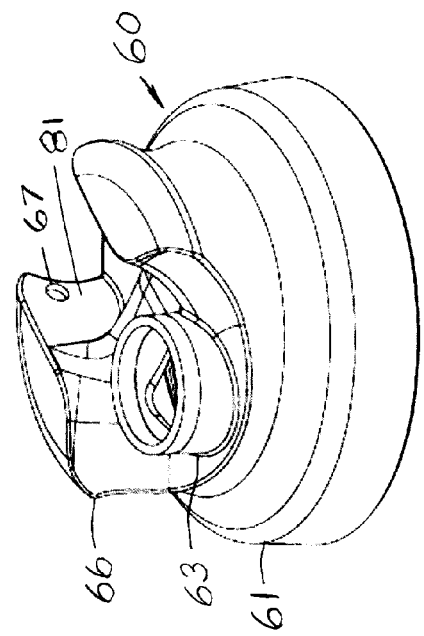

Agitator Options

Molded Logo

Molded figurine

Flat Printable Panel

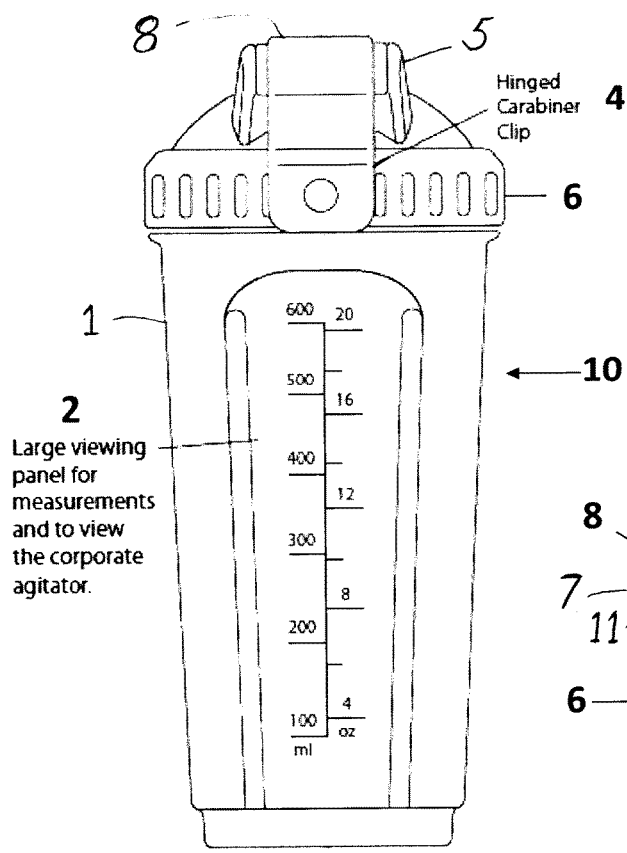
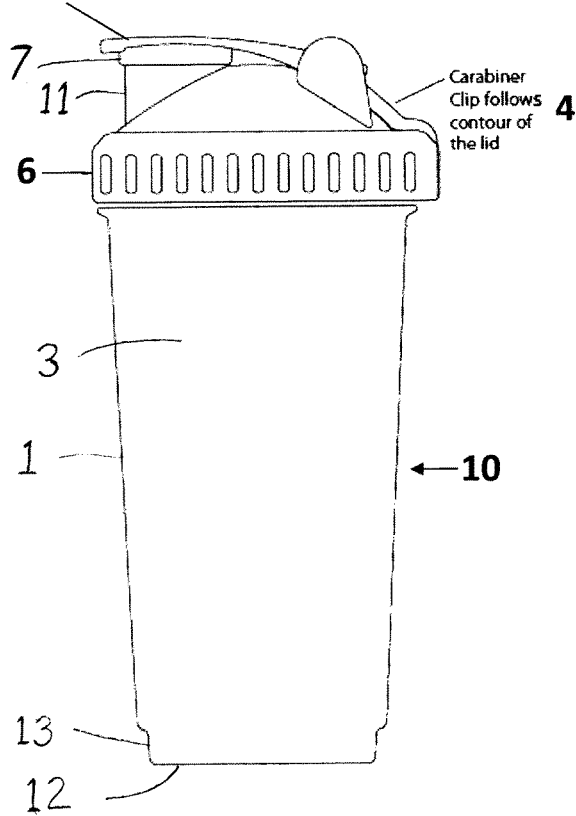

Bottom View of body
showing flat viewing panel

Top view of
oval screw-on lid

Carabiner Clip
Attached to the
hinge

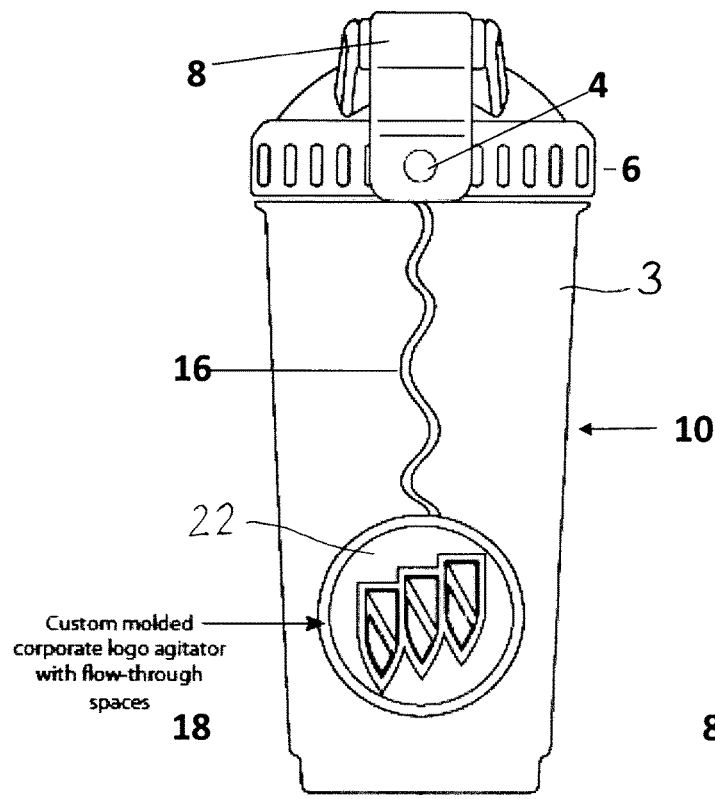
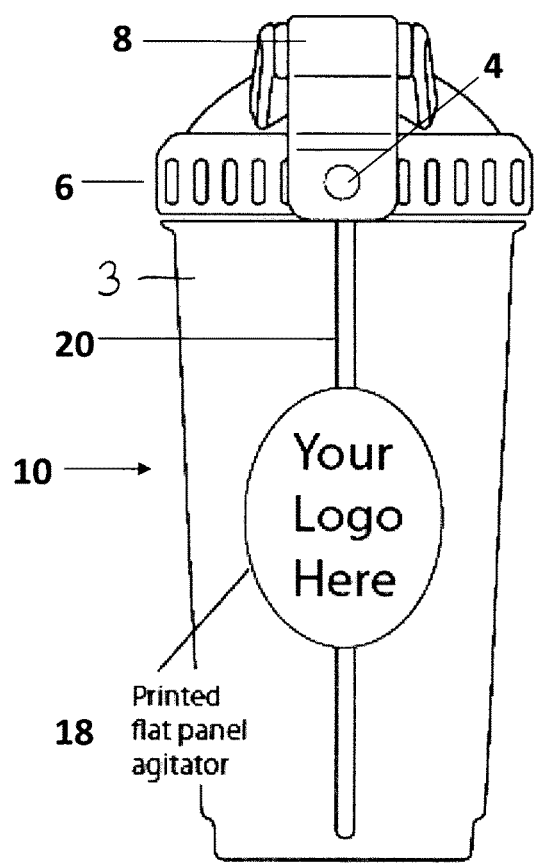

22 — Agitator with open flow-through spaces
18
22
24 — Top view of agitator
25

26 — Molded Logo
32 — Agitator attachment

32 — Agitator attachment
28 — Molded figurine

32 — Agitator attachment
Your Logo Here
30 — Flat Printable Pane

SHAKER BOTTLE AND AGITATOR

This application claims the benefit of U.S. Provisional Application No. 61/879,848 filed Sep. 19, 2013, which is hereby incorporated by reference in its entirety as if fully set forth herein.

SUMMARY OF THE INVENTION

An assembled shaker has a customizable agitator and a screw-on oval lid with a pour spout, a hinged snap-on cap and a hinged carabiner clip. The assembled shaker bottle has several agitator approaches: a printable panel; shaped figurines of characters, object, faces, etc.; and names, all of which operate as agitators.

Agitators may show corporate logos or cartoons or comic figurines. Printable or engraved panels, business or client names or nicknames are supported between springs. The entire movable assemblies act as the agitators. The springs may be metal or molded plastic helixes in conical or cylindrical shape or resilient curved forms that resemble and provide the spring-like qualities and functions.

The new shaker bodies are transparent or translucent and have large flat or curved viewing windows on opposite sides for viewing the agitators and seeing the printed panels, figurines or names.

The new lid is unique, with the new hinged stopper cap and the new hinged carabiner clip that conform to the lid curvature and disappear into the lid. A mushroom shape of the lid has an outward extending side or indentations allowing rotating of the stopper cap or carabiner upward around a hinge axis.

The body is unique as showing the agitator though large viewing panels. The viewing panels have level markers for precise measurements and may have lens-like thickness for magnifying the agitators. The agitators are unique. The agitators may have one or more through-holes with mixing edges. The agitators can be any printed panels, figurines, logos or names with or without open spaces, through which liquid can travel, and which are supported by spring wire frameworks, or constructions that act as agitators to shear, deflect and mix the liquid. The agitators attach to the small inner ends of opposite internal devices or conical springs. The decorative and informational agitators move freely in the center of the mixers bottle. The ability to offer custom made corporate agitators is unique. Agitators may be molded, stamped or cast. The agitators may be in shapes of cartoon characters, vehicles or vehicle parts, corporate logos or names, for example. Flat mixing panels, figurines or letters used along with the wire springs as additional agitators are unique because of the dual agitation ability in the new dual agitation system.

In other embodiments, the new agitators operate by hanging from a flexible or resilient attachment, sliding on a pole or rigid attachment, or as physically independent agitators.

A shaker assembly has a body, a lid connectable to the body and an agitator mounted within the body. The agitator is flat and has mixing edges for mixing any material held within the body as the body with the lid attached is shaken to shear and blend, mix or homogenize any material within the body.

The body has transparent viewing panels for viewing the agitator within the body. The agitator has a corporate logo visible through its transparent viewing panels. The agitator is in the shape of a corporate logo with the mixing edges being edges of the corporate logo. The agitator has at least one through-hole with additional mixing edges.

In one embodiment, a tether is connected to the lid and to one of the mixing edges of the agitator, the tether allowing movement of the agitator throughout the body. The agitator has more than one flat parts joined at angles, the flat parts have mixing edges and the flat parts displaying company logos.

In another embodiment, a rod is connected to the lid and a central annular opening in the agitator receives the rod and slides the agitator along the rod when the lid is secured on the body and the body is shaken. The agitator has multiple open through spaces with mixing edges.

Springs are connected to and extend opposite from the agitator, and bounce and accelerate the agitator through the body when the lid is secured to the body and the body is shaken. The springs are conical and have smaller diameter ends connected to the agitator and larger diameter ends positioned outward from the agitator, thereby supporting the agitator on one of the larger diameter ends in contact with a bottom of the body when the body is at rest.

A distance between the larger diameter ends of the spring is greater than a cross-sectional dimension of the body, ensuring that the springs and agitator remain upright in the body. An upper end of the body has a threaded engagement and a lower end of the lid has a complementary threaded engagement for tightening the lid on the body. A hinge is connected to the lid, a tab is connected to the hinge and an opening in the tab receives a holder such as a snap-ring or carabiner to transport the shaker assembly.

The lid further comprises a base for connecting to the shaker body, a pouring spout on the base, and a cover hingedly connected to the base for closing and opening the pouring spout. The cover and the base have smooth outer contours forming a smooth outer surface of the lid. The lid has a base gap with two upstanding portions on opposite sides of the base gap. Inner sides of the upstanding portions have hinge connection. The cover has downward extending sides, and the downward extending sides have complementary hinge connections.

The cover has a cover gap near the complementary hinge connections. A carabiner connector is positioned in the cover gap and is hingedly connected to the cover in the cover gap. The carabiner connector folds into the cover gap for storage. Pressing on an edge of the carabiner connector rotates it out of the cover gap for use. When the carabiner connector is stored in the cover gap and the cover is closed, the carabiner and the cover form parts of the smooth outer surfaces of the lid.

A shaker assembly has a container with viewing panels. An agitator is viewable through the viewing panel. The agitator has a message display connected to a guide. The holder is a flexible tether, a rod or springs. Conically tapered springs have inner smaller ring-shaped ends connected to an agitator display and outer larger ring-shaped ends positioned away from the agitator. The agitator printed panels, molded figurines, corporate logos or corporate names are visible through the viewing panel when the shaker assembly is at rest. The lid has a smooth outer surface. A hinged cover rises from the smooth outer surface to open a pouring spout in the lid. A carabiner clip rises from the smooth outer surface of the lid.

A shaker assembly has a body, a lid connectable to the body and an agitator mounted within the body. The agitator has mixing edges on the agitator for mixing any material held within the body as the body with the lid attached is shaken to shear and blend, mix or homogenize any material within the body. Springs are connected to and extend opposite from the agitator and bounce and accelerate the agitator through the body when the lid is secured to the body and the body is shaken.

The springs are conical and have smaller diameter ends connected to the agitator and larger diameter ends positioned outward from the agitator, thereby supporting the agitator on one of the larger diameter ends in contact with a bottom of the body when the body is at rest.

A distance between the larger diameter ends of the spring is greater than a cross-sectional dimension of the body, ensuring that the springs and agitator remain upright in the body.

The body has one or more transparent viewing panels for viewing the agitator within the body. The agitator has a corporate logo visible through the one or more transparent viewing panels. The agitator is in the shape of a corporate logo with the mixing edges being edges of the corporate logo. The agitator has at least one through-hole with additional mixing edges.

The lid has a base for connecting to the shaker body, a pouring spout on the base, and a cover hingedly connected to the base for closing and opening the pouring spout. The cover and the base have smooth outer contours forming a smooth outer surface of the lid.

The lid has a base gap with two upstanding parts on opposite sides of the base gap. Inner sides of the upstanding parts have hinge connection. The cover has downward extending sides, and the downward extending sides have complementary hinge connections.

The cover has a cover gap near the complementary hinge connections. A carabiner connector is positioned in the cover gap and is hingedly connected to the cover in the cover gap. The carabiner connection folds into the cover gap for storage and folds out of the cover gap for use. When the carabiner connection is stored and the cover is closed, the entirety of the lid has smooth outer surfaces.

In other embodiments, a tether is connected to the lid and to one of the mixing edges of the agitator, the tether allowing movement of the agitator throughout the body. In one form, a rod is connected to the lid and a central annular opening in the agitator receives the rod and slides the agitator along the rod when the lid is secured on the body and the body is shaken. The agitator has multiple open through spaces with mixing edges.

These and further and other objects and features of the invention are apparent in the disclosure, which includes the above and ongoing written specification, with the claims and the drawings.

BRIEF DESCRIPTION OF THE DRAWINGS

FIG. 9 is a front view of the agitator.

FIG. 10 is a cross-sectional view of the agitator taken along line B-B in FIG. 22.

FIG. 13 is a cross-sectional view of the shaker taken along line A-A of FIG. 18.

FIG. 14 is a top and front perspective view of the shaker lid.

FIG. 15 is a top and front perspective view of the shaker lid with the hinged carabiner clip removed.

FIG. 16 is a top and front perspective view of the shaker lid with the hinged pour spout cover removed.

FIG. 17 is an exploded view of parts of the shaker lid.

FIG. 21 is a front view of the assembled shaker showing a screw-on oval lid with a hinge and snap-on cap, a large viewing panel for measurements and to view the corporate agitator, and a hinged carabiner clip.

FIG. 22 is a side view of the assembled shaker.

FIG. 28 shows an example of a custom molded corporate logo agitator with flow-through spaces hanging from an elastic band connection within the assembled shaker.

FIG. 29 is a view of the assembled shaker with a customizable printed flat panel agitator sliding on a fixed pole.

DETAILED DESCRIPTION

Figure 2:
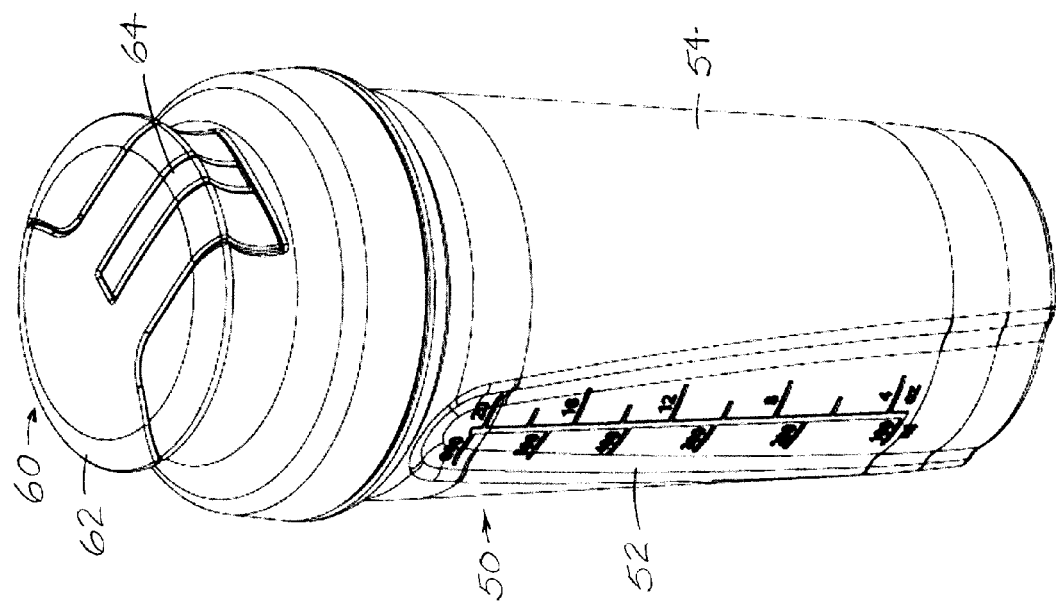
FIGS. 1 and 2 are top and side perspective views of the shaker.
Figure 1:
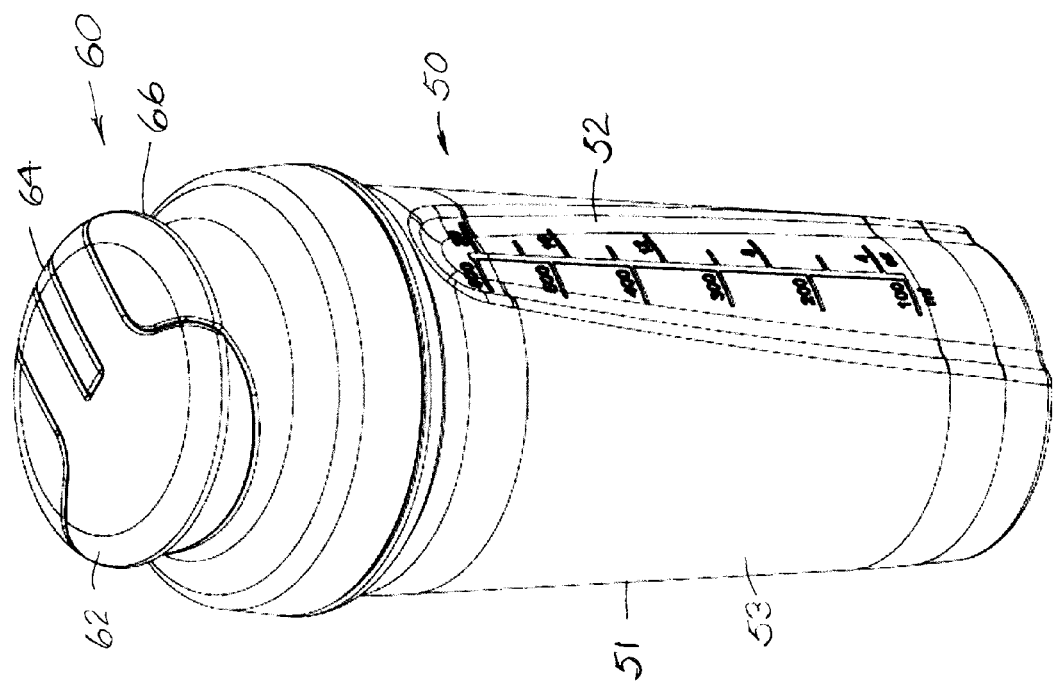
Figure 3:
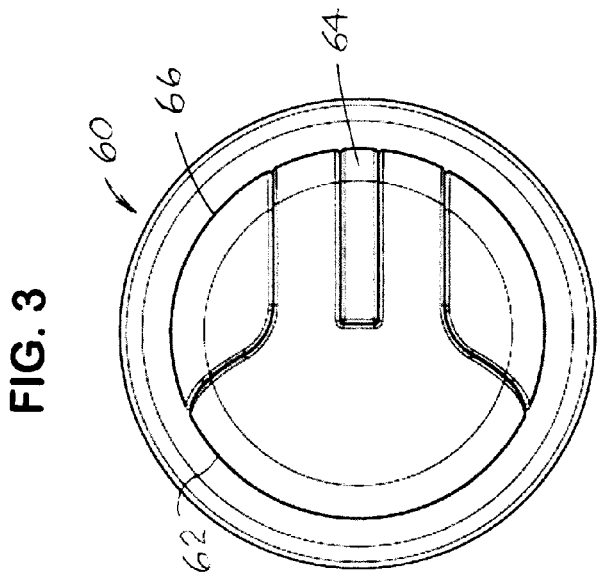
FIG. 3 is a top view of the shaker.

FIGS. 1 and 2 are top and side perspective views of the shaker 50. FIG. 3 is a top view of the shaker lid 60. Shaker body 51 has a large viewing panel 52. Lid 60 has a lid 60, cover 62 and clip 64. A rim 66 extends outward along lid 60, cover 62 and clip 64. The rim 66 enables the cover 62 to be raised by pushing or pulling upward on the rim portion of the cap. The carabiner clip 64 may be raised by pushing downward on the outward extended rim portion of carabiner clip.

Figure 4:
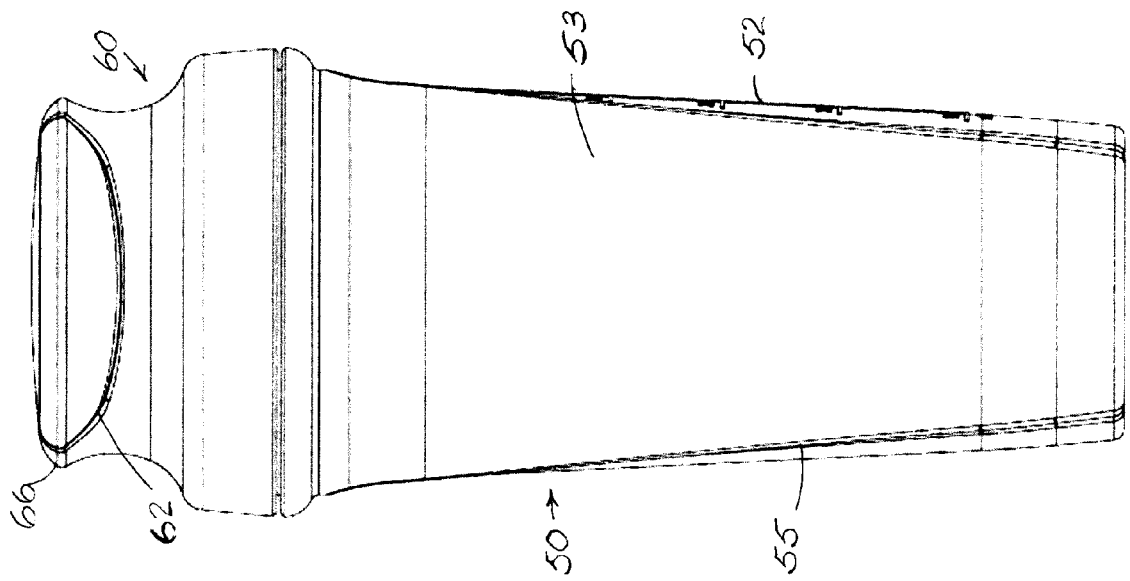
FIGS. 4, 5 and 6 are front, rear and viewing panel side views of the shaker, respectively.
Figure 6:
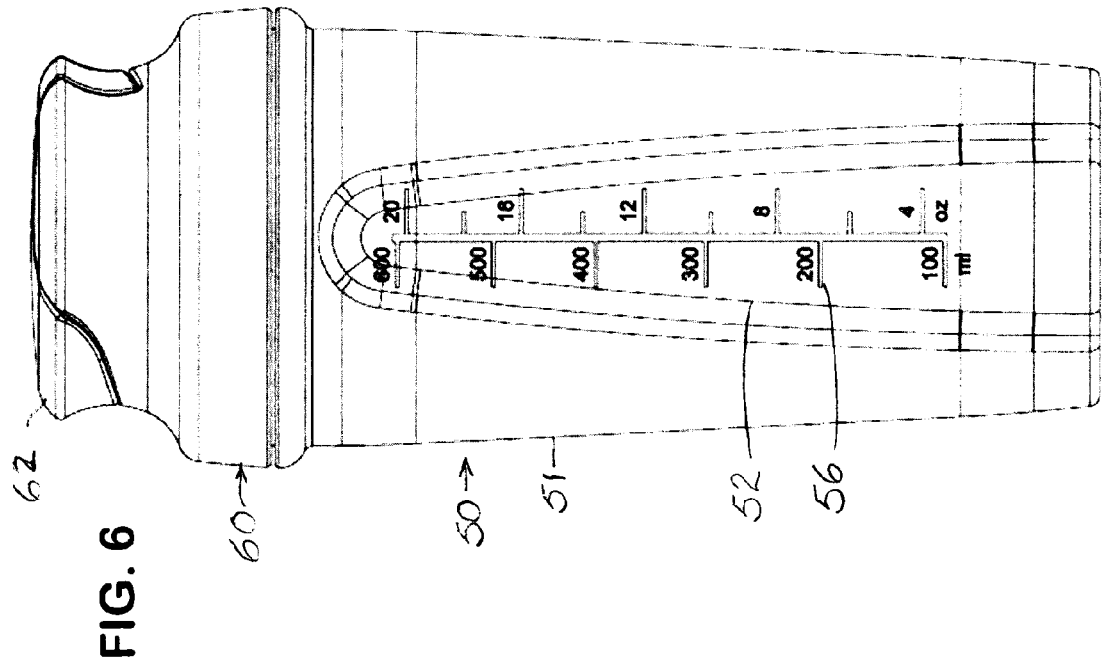
Figure 5:
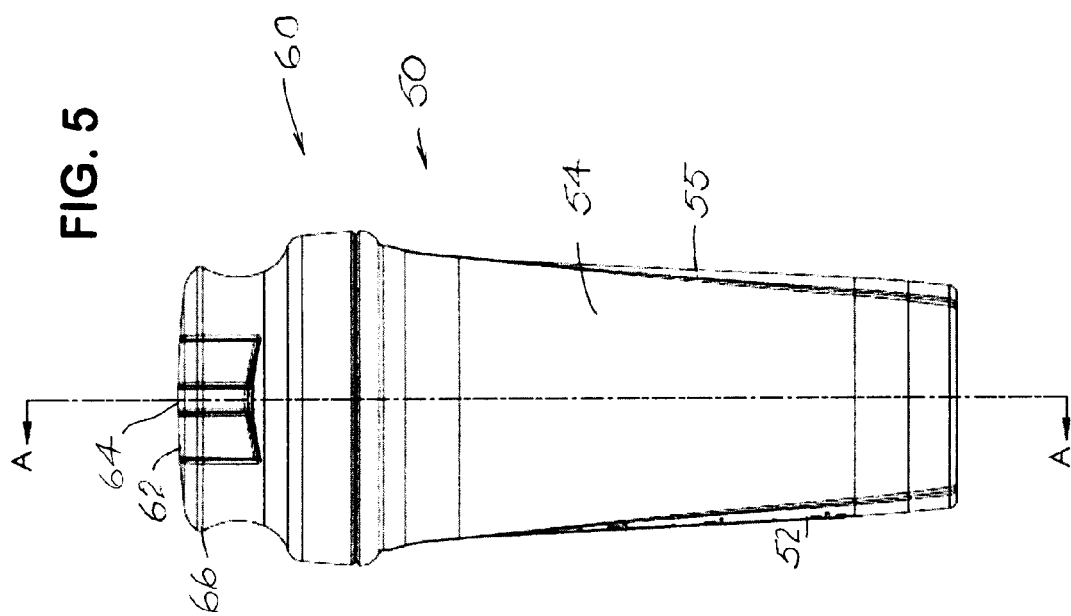

FIGS. 4 through 6 show front 53, back 54 and viewing panel sides 52, 55 respectively. The side opposite the viewing panel side shown in FIG. 6 is a minor image of FIG. 6 having a viewing panel 55 without the liquid level markers 56.

Figure 7:
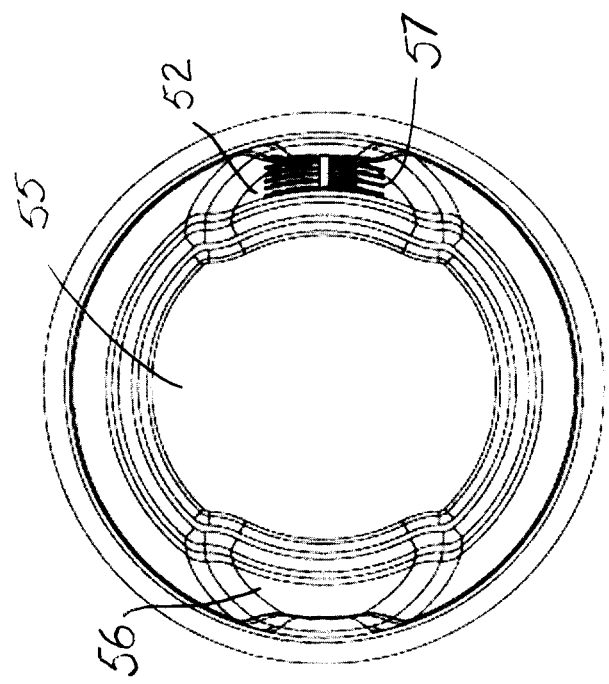
FIG. 7 is a bottom view of the shaker.

FIG. 7 is a bottom view of the shaker 50 showing the shaker bottom 57 and viewing panels 52 and 55. The bottom 55 is shown. Two opposite viewing panels 52 and 56 are shown. The viewing panels are identical, except that viewing panel 52 has level indicators 57, which are absent on viewing panel 56.

Figure 8:
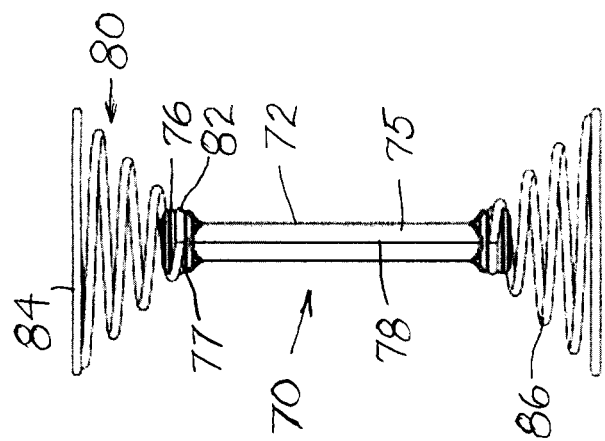
FIG. 8 is a side view of the agitator within the shaker.
Figure 11:
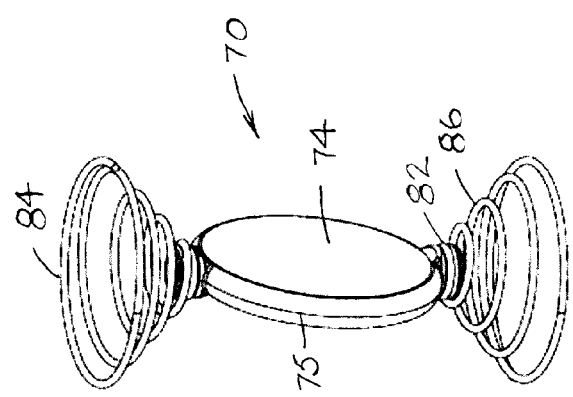
FIG. 11 is a top and rear perspective view of the agitator.

FIG. 8 is a side view of agitator 70 within the shaker 50. FIG. 9 is a front view of the agitator 70. FIG. 10 is a cross-sectional view of agitator 70 taken along line B-B in FIG. 9. FIG. 11 is a top and rear perspective view of agitator 70.

Agitator 70 is shown as a disk 72 with a flat, slightly concaved front and back surfaces 73, 74. Rim 75 has opposite extensions 76. Extensions 76 have grooves 77 to receive and hold the small ring-shaped termini 82 of truncated conical compression coil springs 80. The large ring-shaped termini 84 of the coil spring contact the inside of the shaker body 51 and lid 60 during vigorous shaking and mixing. The spring coils 86 and large, ring-shaped termini 84 of springs 80 and the edges 78 of the disk 70 shear and mix liquid material in the shaker body 51. During shaking, the concave side surfaces 73, 74 of the disk 70 further move and mix the liquid in shaker body 51.

Figure 12:
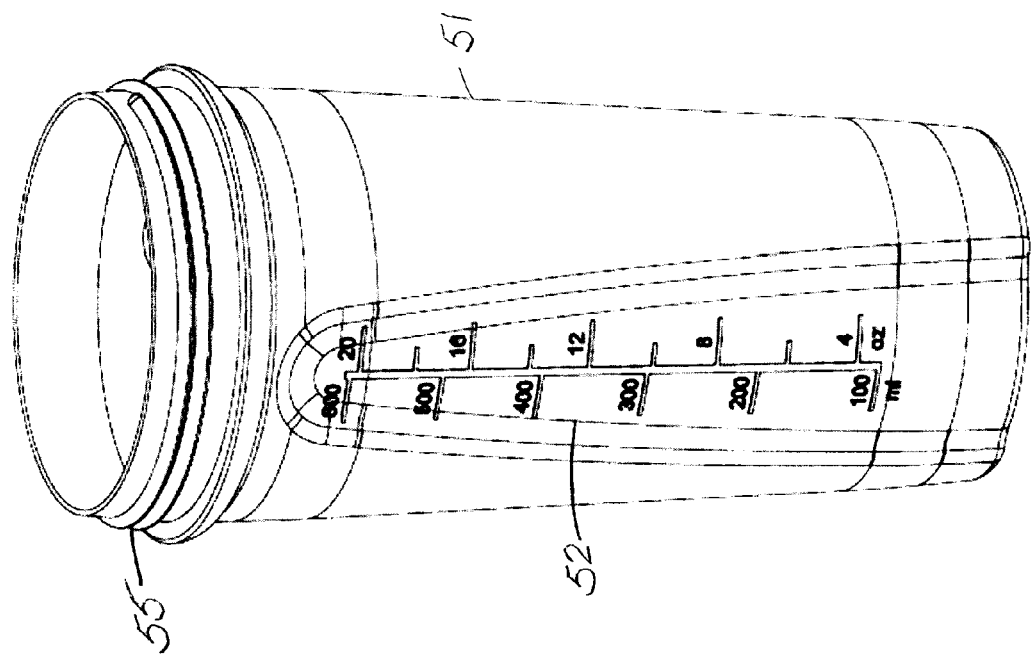
FIG. 12 is a top perspective view of the shaker with the lid removed.

FIG. 12 is a top perspective view of the shaker body 51 with the lid removed. As shown, the shaker body 51 has a threaded connection 55 at its open top for connecting to the screw on lid 60.

FIG. 13 is a cross-sectional view of the shaker 50 taken along line A-A of FIG. 5. Agitator 70 fits with clearance in all directions within shaker body 51. Movement of agitator 70 may be seen through viewing panel 52. When the shaker 50 is at rest, the agitator 70 may be viewed through either of the viewing panels on the opposite sides of the shaker body 51.

FIG. 14 is a top and front perspective view of the shaker lid 60 with the cover 62 and carabiner clip 64 in closed positions.

FIG. 15 is a top and front perspective view of the shaker lid 60 with the hinged carabiner clip removed and the hinged cover 62 remaining in place in closed position.

FIG. 16 is a top and front perspective view of the shaker lid 60 with the hinged pour spout cover 62 removed.

FIG. 17 is an exploded view of lid 60. Lid 60 has three parts that fit together in a smooth contour, the screw-on base 61, the snap on pouring spout cover 62 and the carabiner clip 64. Base 61 has a raised spout 63 that is closed by the snap-in cylindrical seal 65 within cover 62. Two upstanding side portions 66 of the lid 60 have aligned holes 67 that receive cylindrical lugs of a hinge rod 68 that snap into the aligned holes in the side portions 66.

Inner walls 81 of the side portions 66 are curved inward and downward. Complementary inward and downward curved walls 82 of the cover 62, as shown in FIG. 17, aid in the assembling of the cover in side portions 66 of the lid 60 and in holding the cover 62 in a closed or open position.

Carabiner clip 64 has a hole 83 for receiving a carabiner. A narrow groove 85 elastically receives the hinge bar 68 extending inward through the groove 84 in the lid 62. A wider hole 87 at the top of the groove 85 is snapped onto the hinge bar 68.

Figure 18:
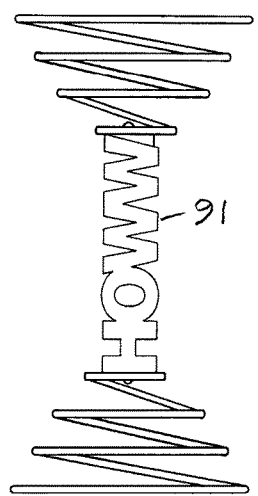
FIGS. 18, 19 and 20 show agitator options.
Figure 19:
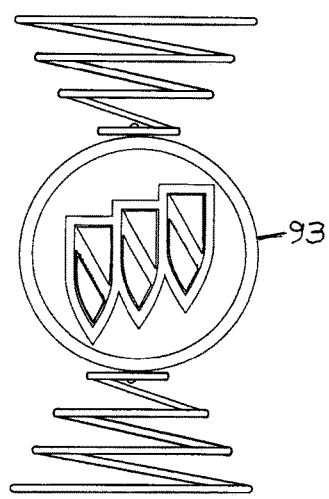
Figure 20:
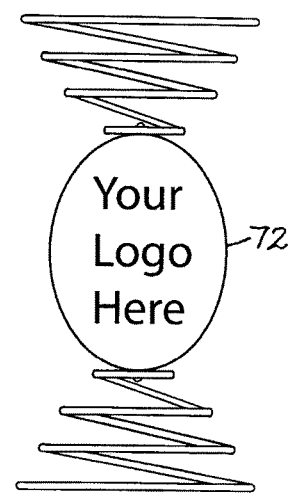

FIGS. 18, 19 and 20 show agitator options.

FIG. 18 shows a molded logo 91 joined to the inner ring-shaped termini 82 of springs 80.

Figure 23:
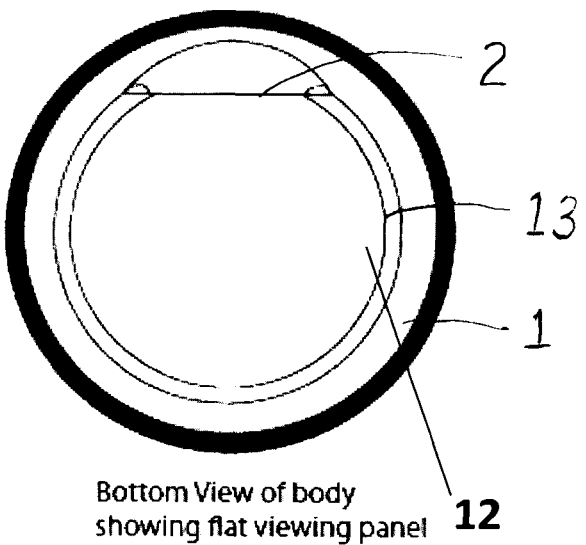
FIG. 23 is a bottom view of the body of the shaker showing the flat viewing panel.

FIG. 19 shows a molded figurine 92 having a corporate logo. Figurine 92 has end lugs with grooves as shown in FIG. 23 for receiving and holding the inner ring-shaped termini 82 of springs 80.

FIG. 20 shows a plain disk 71, as shown in FIGS. 21-24, for holding a printed logo.

As shown in FIGS. 21-33, an assembled shaker 10 has a body 1 enclosing a customizable agitator 18, 26, 28, 30 (FIGS. 26-33). A screw-on oval lid 6 has a hinge 5. A snap-on pouring spout closure cap 7 on a resilient arm 8 and a carabiner clip 4 are pivoted on hinge 5. The assembled shaker 10 has three agitator approaches: (1) a printable panel 30 that acts as an agitator 18; (2) a molded figurine 28 that acts as an agitator 18; and (3) a molded client-corporate name 26 that acts as an agitator 18. The agitator 18 can hang from a tether such as an elastic band 16 (FIG. 26), slide on a rigid fixed pole or tube 20 (FIG. 27), or may be free-moving and physically independent (FIGS. 30-33).

FIG. 21 is a front view of the assembled shaker 10 showing a hinge 5 on lid 6. Hinge 5 hinges resilient cap-carrying arm 8 and carabiner clip 4. A large viewing panel 2 on the body 1 has measurements scales and provides a view of an internal corporate logo agitator.

FIG. 22 is a side view of the assembled shaker 10 showing the translucent or transparent wall 3 of the body 1. A resilient arm 8 is hinged on hinge 5. Arm 8 carries a cap 7 that snaps on the top of the pouring spout 11 to seal the spout. A carabiner clip 4 is also hinged on hinge 5.

FIG. 23 is a view of bottom 12 of the body 1 of the shaker 10, showing the flat viewing panel 2 for viewing of the corporate agitator 18. A step 13 extends upward from the bottom 12.

Figure 24:
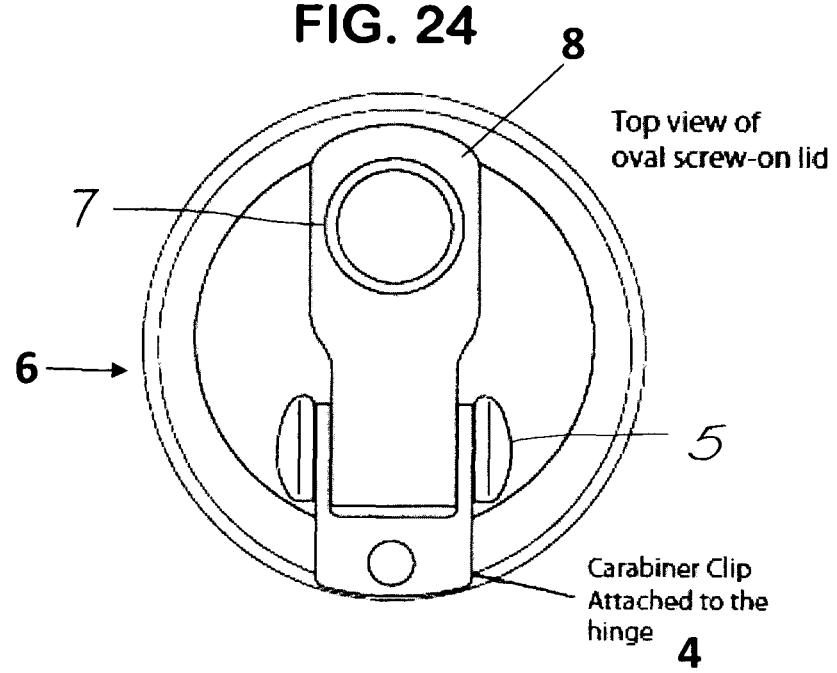
FIG. 24 is a top view of the shaker depicting the screw-on oval lid with a hinge, a snap-on cap and a carabiner clip attached to the hinge.

FIG. 24 is a top view depicting the screw-on domed oval lid 6 of the shaker. Hinge 5 on lid 6 pivots the hinged carabiner clip 4 and the hinged arm 8 of the snap-on cap 7 that closes or opens the spout to allow pouring from the shaker without removal of the screw-on lid 6.

Figure 25:
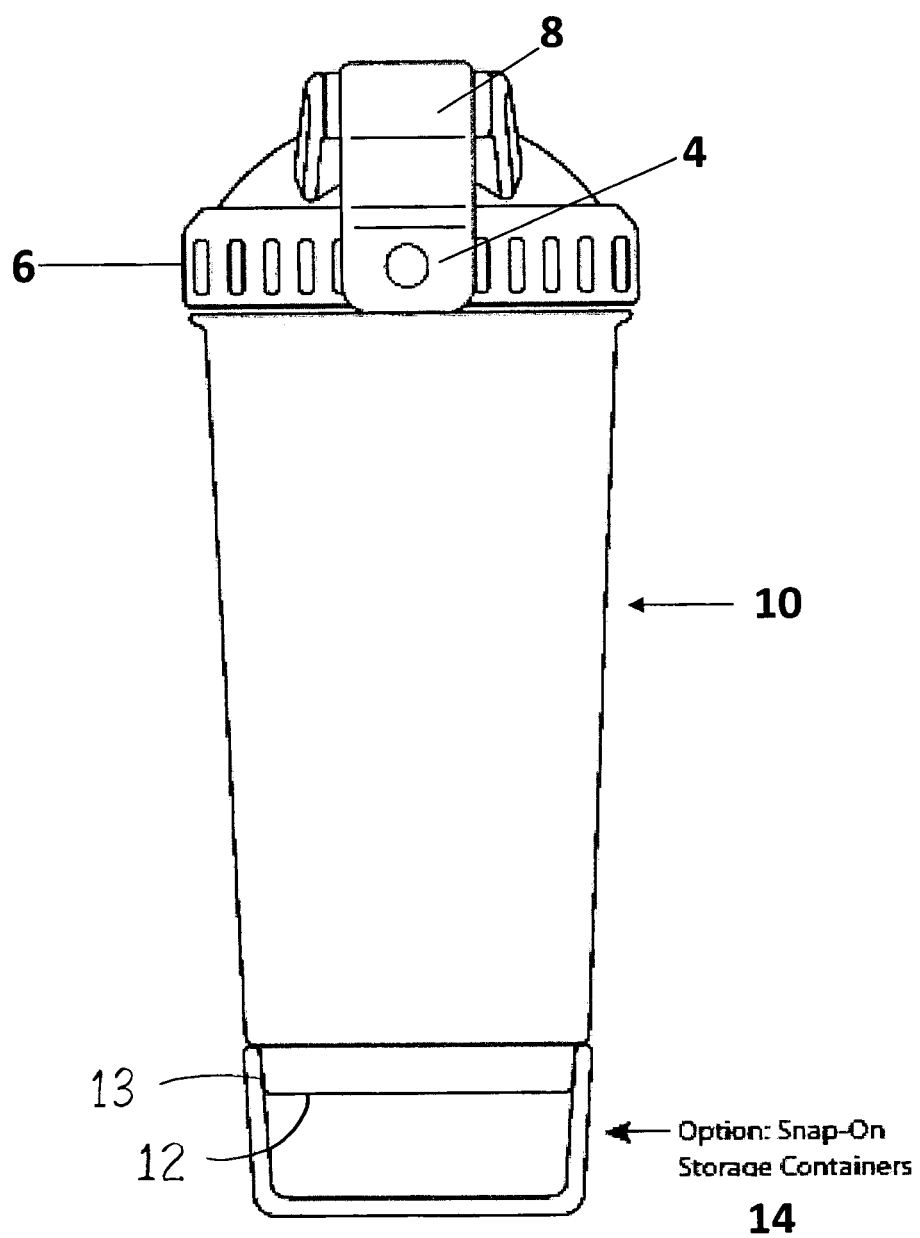
FIG. 25 is a view of the assembled shaker attached to an optional snap-on storage container or drinking glass.

FIG. 25 is a rear view of the assembled shaker 10. Step 13 on bottom 12 holds an attached optional snap-on tasting or drinking cup or storage container 14.

Figure 26:
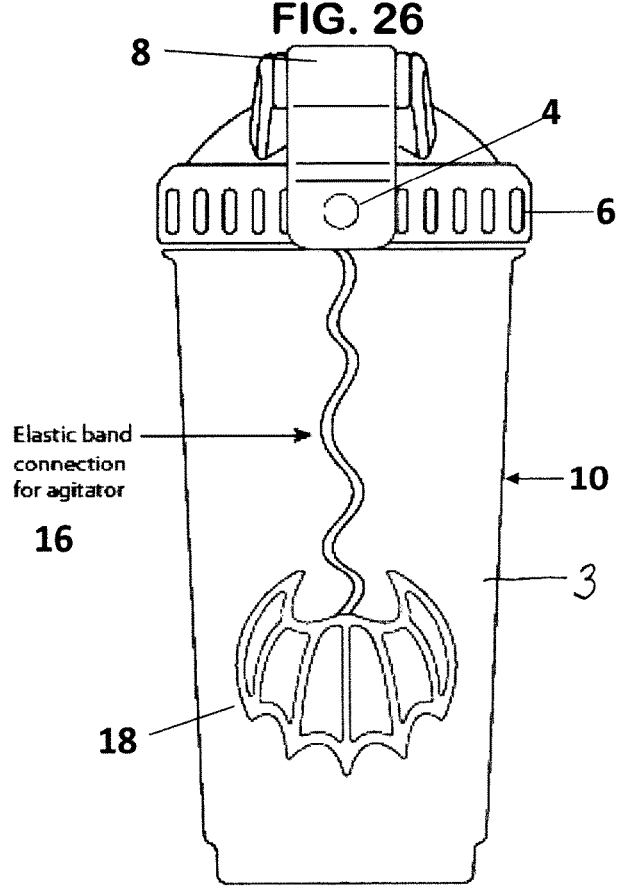
FIG. 26 is a view of the assembled shaker with an agitator hanging from an elastic band connection.

FIG. 26 is a view through a transparent wall 3 of the assembled shaker 10 with an agitator 18 hanging from stretchable, resilient or elastic band 16. The tether 16 for hanging agitator 18 may be attached to the lid 6 or to an intermediate flat mixing screen having an edge held between the top of the shaker body 1 and lid 6. The flat mixing screen may be separated from the shaker body.

Figure 27:
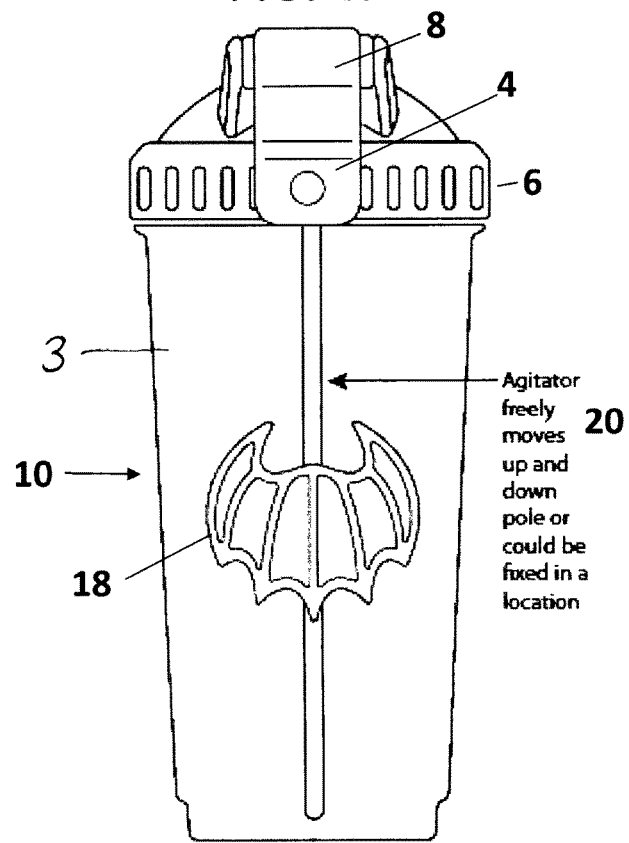
FIG. 27 is a view of the assembled shaker with an agitator sliding on a pole fixed to the cap.

FIG. 27 is a view through a transparent wall 3 of the assembled shaker 10 with an agitator 18 sliding or fixed on a tube or pole 20 which is attached to the screw-on lid 6 or an intermediate screen of the shaker. A sliding embodiment has a large central hole for freely moving up and down on tube or pole 20.

FIG. 28 shows an example of a custom molded corporate logo agitator 18 with flow-through spaces 22. Agitator 18 hangs from a tether or elastic band 16 connected to lid 6 or to an intermediate screen within the assembled shaker 10.

FIG. 29 is a view of the assembled shaker 10 looking through transparent wall 3 at a customizable printed flat panel agitator 18 sliding or fixed on a tube or pole 20.

Figure 30:
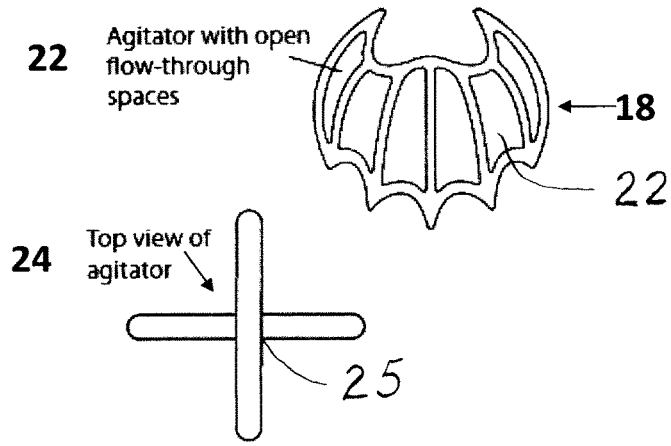
FIG. 30 shows side and top views of an agitator having open flow-through spaces.

FIG. 30 shows side and top views of an agitator 18 having open flow-through spaces 22. The agitator has an X-shape 24, as shown in the top view, to better mix contents of shaker 10. When the agitator 18 slides on a tube or pole, a large opening extends through a center 25 of the agitator. When the agitator 18 is connected to a spring or spring, as shown in FIGS. 31-33, springs are attached to lower and/or upper centers 25.

Figure 31:
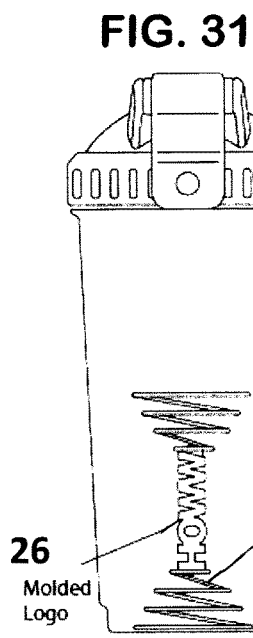
FIG. 31 shows a physically independent loose molded client/corporate name agitator having mixing, rebounding and silencing springs within the assembled shaker.

FIG. 31 shows a physically independent agitator 26 molded as a client/corporate name 26 with agitator spring attachments 32 on upper and lower ends of the agitator. The springs 32 shear, stir and mix the liquid or slurry in shaker 10 and rebound, quiet and reduce impacts within the assembled shaker 10.

Figure 32:
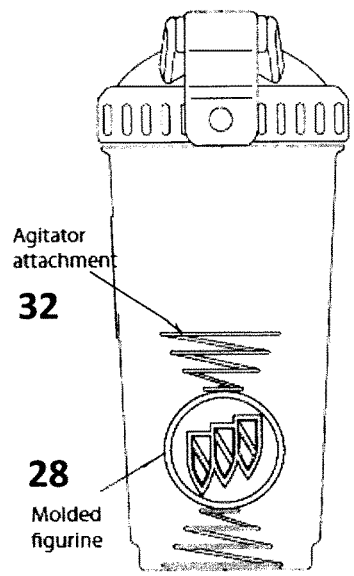
FIG. 32 shows a physically independent molded figurine agitator having upper and lower springs within the assembled shaker.

FIG. 32 shows a physically independent molded corporate logo figurine agitator 28 with agitator spring attachments 32 for mixing contents, controlling impacts and providing agitator rebounds within the assembled shaker 10.

Figure 33:
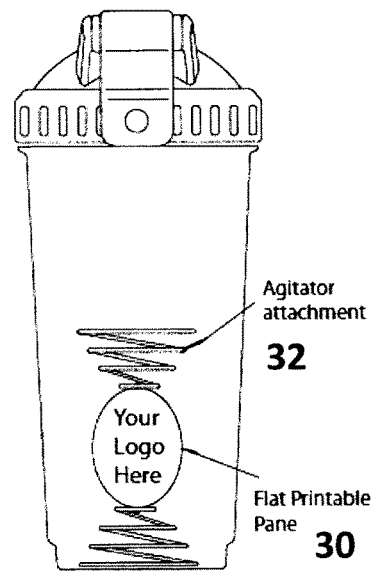
FIG. 33 shows a physically independent flat printable panel agitator with springs attached within the assembled shaker.

FIG. 33 shows a physically independent flat printable panel 30 agitator 30 with attachment springs 32 for content mixing, impact reduction and rebounding of the agitator within the assembled shaker 10.

While the invention has been described with reference to specific embodiments, modifications and variations of the invention may be constructed without departing from the scope of the invention, which is defined in the following claims.

I claim:

1. Apparatus comprising,
a shaker assembly having,
a shaker body adapted to hold liquid material,
a lid connectable to the body,
a generally planar agitator mounted within the shaker body, the plane of the agitator being generally parallel to sides of the shaker body, wherein the agitator has printable panels, figurines or names and has mixing edges on the agitator, wherein the mixing edges are adapted for shearing, blending and mixing any material held within the body as the body with the lid attached are shaken to reciprocate the agitator to shear and blend, mix or homogenize the liquid material within the body,
two separated conical springs having large ends and small ends, the small ends of the springs connected to the agitator and the springs extending in opposite directions from the agitator and being adapted to bounce and accelerate the agitator through the body when the lid is secured to the body and the body is shaken, conical coils of the springs also adapted to shear, blend and mix or homogenize the liquid material within the body with the conically disposed coils moving through different areas of the liquid material.

2. The apparatus of claim 1, wherein the agitator has a rim and the rim has opposite extension and grooves in the extensions, wherein the springs are truncated conical springs and have smaller diameter ring-shaped ends connected to the grooves in the opposite extensions of the agitator and larger diameter ends positioned outward from the agitator, thereby supporting the springs and the agitator on one of the larger diameter ends of the springs in contact with a bottom of the body when the body is at rest.

3. The apparatus of claim 1, wherein a distance between the larger diameter ends of the spring is greater than a cross-sectional dimension of the body, ensuring that the springs and agitator remain upright in the body.

4. The apparatus of claim 1, wherein the body has a circular base and wherein the conical springs have flat ring-shaped large ends that are smaller in diameter than the base of the body and at least one of the flat ring-shaped large ends is adapted to contact liquid material near edges of the circular base of the body as the springs and agitator reciprocate, wherein the body has one or more transparent viewing panels for viewing the agitator within the body.

5. The apparatus of claim 4, wherein the agitator is visible through the one or more transparent viewing panels.

6. The apparatus of claim 1, wherein the agitator is a figurine having the shape of a corporate logo with the mixing edges being edges of a molded figurine in the shape of the corporate logo.

7. The apparatus of claim 1, wherein the figurine of the agitator is molded in a form of a name.

8. The apparatus of claim 1, wherein the agitator is a figurine in the shape of a cartoon character or face.

9. Apparatus comprising,
a shaker assembly having,
a shaker body adapted for holding liquid,
a lid connectable to the body and adapted to contain the liquid within the body,
a generally planar agitator mounted within the shaker body, the plane of the agitator being generally parallel to sides of the body, wherein the agitator has a flat panel, mixing edges on the agitator, the mixing edges being adapted for shearing, blending and mixing liquid material held within the shaker body, wherein the agitator has a rim, and two opposite extensions on the rim and circular grooves around the extensions, and further comprising two separated conical springs having flat ring-like smaller ends of the conical springs, the flat ring-like smaller ends being snapped into and held in the grooves on the extensions as the shaker body with the lid attached is shaken to shear and blend, mix or homogenize any material within the shaker body, the lid having a lid body with a base for connecting to the shaker body, a pouring spout on the lid body, and a cover hingedly connected to the lid body for closing and opening the pouring spout, wherein the cover and the lid body have smooth outer contours forming smooth outer surfaces on a top and sides of the lid.

10. The apparatus of claim 9, wherein the lid body has a lid gap with two upstanding portions on opposite sides of the lid gap, wherein inner sides of the upstanding portions have hinge connections, wherein the cover has downward extending sides, and wherein the downward extending sides have complementary hinge connections.

11. The apparatus of claim 10, wherein the cover has a cover gap near the complementary hinge connections, further comprising a carabiner connector positioned in the cover gap and hingedly connected in the cover gap, wherein the carabiner connection folds out of the cover gap for use and folds into the cover gap for storage, wherein in storage, the carabiner connection completes the smooth outer contours and the smooth outer surface on the top and sides of the lid.

12. The apparatus of claim 9, wherein the lid has a lower portion and an upper portion, and wherein the upper portion extends outward beyond the lower portion and an edge of the cover is in the outward extending upper portion for raising the cover.

13. The apparatus of claim 11, wherein an edge of the carabiner is in the outward extending upper portion for raising the carabiner clip.

14. The apparatus of claim 9, wherein the body has one or more transparent viewing panels for viewing the agitator within the body.

15. The apparatus of claim 14, wherein the agitator is visible through the one or more transparent viewing panels.

16. The apparatus of claim 9, wherein the conical springs connected to and extended in opposite directions from the agitator are adapted to bounce and accelerate the agitator through the body when the lid is secured to the body and the body is shaken, and wherein the springs are adapted to also act as mixers, wherein the springs are truncated conical springs and have the smaller diameter ring-like ends connected to the agitator, and wherein larger diameter ends of the springs are positioned outward from the agitator, thereby supporting the springs and the agitator on one of the larger diameter ends of the springs in contact with a bottom of the body when the body is at rest.

17. The apparatus of claim 16, wherein a distance between the larger diameter ends of the springs is greater than a cross-sectional dimension of the body, ensuring that the springs and agitator remain upright in the body.

18. The apparatus of claim 9, wherein the agitator is a printed or printable panel.

19. The apparatus of claim 9, wherein the agitator is a figurine.

20. The apparatus of claim 9, wherein the agitator is in the shape of a name.

\* \* \* \* \*